(12) United States Patent
Allen et al.

(10) Patent No.: US 8,082,403 B1
(45) Date of Patent: Dec. 20, 2011

(54) METHOD FOR CERTIFYING ERASURE OF ONE OR MORE DATA STORAGE DISK DRIVES

(75) Inventors: Andrew Bonner Allen, Boston, MA (US); Shane Patrick Cowman, Tower (IE); Pierce Michael Whelan, Glanmire (IE)

(73) Assignee: EMC Corporation, Hopkinton, MA (US)

( * ) Notice: Subject to any disclaimer, the term of this patent is extended or adjusted under 35 U.S.C. 154(b) by 590 days.

(21) Appl. No.: 11/640,068

(22) Filed: Dec. 15, 2006

(51) Int. Cl.
*G06F 12/00* (2006.01)
*G06F 13/00* (2006.01)
*G06F 13/28* (2006.01)

(52) U.S. Cl. .................. 711/154; 711/112; 711/114

(58) Field of Classification Search .............. 711/112, 711/114, 154
See application file for complete search history.

(56) References Cited

U.S. PATENT DOCUMENTS

| | | | | |
|---|---|---|---|---|
| 4,703,379 A * | 10/1987 | Bogdanski | .................. | 360/118 |
| 5,680,579 A * | 10/1997 | Young et al. | .................. | 711/157 |
| 6,088,176 A * | 7/2000 | Smith et al. | .................. | 360/46 |
| 6,404,707 B1 * | 6/2002 | Kaneda et al. | .................. | 369/30.06 |
| 6,725,379 B1 * | 4/2004 | Dailey | .................. | 726/35 |
| 7,035,172 B1 * | 4/2006 | Murata | .................. | 369/33.01 |
| 7,079,345 B1 * | 7/2006 | Nguy et al. | .................. | 360/66 |
| 2004/0008375 A1 * | 1/2004 | Fukuhara et al. | .................. | 358/1.16 |
| 2005/0066139 A1 * | 3/2005 | Inoue et al. | .................. | 711/163 |
| 2005/0073766 A1 * | 4/2005 | Price et al. | .................. | 360/66 |
| 2005/0088941 A1 * | 4/2005 | Huang | .................. | 369/53.31 |
| 2005/0286378 A1 * | 12/2005 | Ma et al. | .................. | 369/53.15 |
| 2006/0224827 A1 * | 10/2006 | Hirofuji et al. | .................. | 711/114 |
| 2007/0168564 A1 * | 7/2007 | Conley et al. | .................. | 710/1 |
| 2007/0192557 A1 * | 8/2007 | Kezuka et al. | .................. | 711/164 |
| 2007/0226413 A1 * | 9/2007 | Elliott et al. | .................. | 711/114 |
| 2008/0013245 A1 * | 1/2008 | Schultz et al. | .................. | 361/149 |
| 2008/0060086 A1 * | 3/2008 | Bhansali et al. | .................. | 726/35 |
| 2008/0126631 A1 * | 5/2008 | Bailey et al. | .................. | 710/74 |

* cited by examiner

*Primary Examiner* — Sheng-Jen Tsai
(74) *Attorney, Agent, or Firm* — Krishnendu Gupta; Joseph D'Angelo (57) ABSTRACT

A method for certifying data storage disk drive erasure including a server with a software program for erasing the disks, a step of inserting the disk drive to be erased, erasing it, and creating a printable file usable for certifying the erasure.

13 Claims, 10 Drawing Sheets

(FRONT VIEW)
FIG. 11

(REAR VIEW)
FIG. 12

METHOD FOR CERTIFYING ERASURE OF ONE OR MORE DATA STORAGE DISK DRIVES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally data protection for users of computers, and more specifically to methods, systems, apparatus, and an architecture for such data protection.

RELATED APPLICATION

This application is a related to co-pending U.S. patent application Ser. No. 11/639,933 entitled "Appliance for Erasure of One or More Data Storage Disk Drives" by Cowman, et al., filed on even date, Dec. 15, 2006, and is assigned to EMC Corporation, the same assignee as this invention.

BACKGROUND OF THE INVENTION

Disk drives are a key way that data is stored for most companies. Drives are much more accessible, reliable, and dense than just about any magnetic or electronic alternative. Moreover, data can be stored on them over and over again. As data is erased, new date can be added. However, despite their robust reliability, many disk drives do eventually fail, and then need replacing.

When a service company, such as the disk drive supplier, is called in to replace a failing disk drive, it has two competing interests. It has its own concern, of possibly being able to return the failed disk drive to the disk drive manufacturer under a warranty or other contractual agreement. On the other hand, the company whose data is stored on the disk drive has an important concern to not allow sensitive data to fall into $3^{rd}$ party hands. Its own business information may be stored on the disk drive, or data of customers or partners, or it may be under obligation because it has sensitive government information stored thereon. Moreover, if that is the case there are several government directives, including those from the Dept. of Defense or other classified source of information that have explicit requirements and specifications requiring destruction of data before a disk drive may be removed. What is needed is a way to balance these needs, and provide advantages of a low-cost, but orderly, and certifiable proof of such data destruction.

SUMMARY OF THE INVENTION

To overcome the problems of the prior art mentioned above and to provide advantages also described above, this invention embodiments include a method for certifying erasure of data from a data storage disk drive. The method includes the steps of providing a server with a software program capable of erasing a data storage disk drive unit, inserting a data storage disk drive unit to be erased into the server, erasing the inserted data storage disk drive unit. A printable file is created indicating that the data storage disk drive unit has been erased, and wherein the printable file is usable to show that the data storage disk drive unit has been erased.

In another embodiment, a method includes the steps of providing a server in communication with a first unit for receiving a data storage disk drive to be erased and including a software program on the server that is capable of erasing the data storage disk drive to be erased after it is received into the first unit. Other steps include inserting a data storage disk drive to be erased into the first unit, erasing the inserted data storage disk drive in the first unit, and creating a printable file indicating that the data storage disk drive has been erased, wherein the printable file may be printed, stored, or displayed to certify that data storage disk drive unit has been erased.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The inventors have critically recognized the need for erasing disks in a rapid, economical, orderly, and certifiable manner. Accordingly, the broadest overview of the invention includes an appliance for erasing disks and a method for certifying disks erased by such an appliance.

Figure 1:
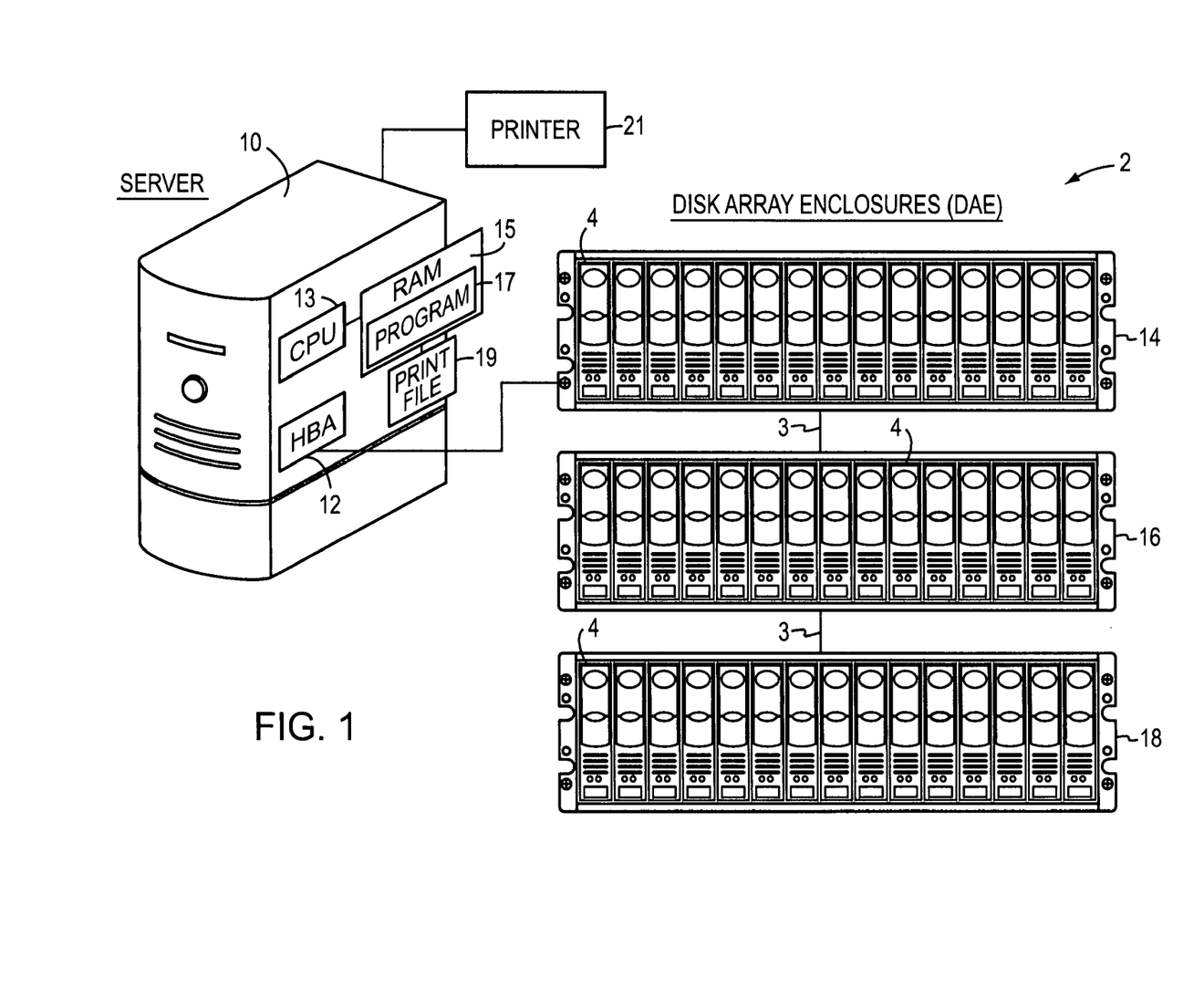
FIG. 1 is an embodiment of a non-portable disk erasure appliance including a server with disk erasure software and an external disk array enclosure.

FIG. 1 is an embodiment of a non-portable disk erasure appliance 2 including a server 10 with disk erasure software or Program 17 loadable and executable in random access memory (RAM) 15 by CPU 13. The Program, though not shown, in all Figures, should be understood to be present throughout all the Appliance embodiments discussed herein with reference to the subsequently numbered Figures following FIG. 1. Regarding terminology, disk is often used herein as a short-hand terminology for disk drive, as it is well understood in the art to use disk for disk drive once it is understood that disk drives are actually being referred to and that is the practice used herein.

Referring again to FIG. 1, Disks 4 in an external disk array enclosure 14, 16, and 18 are erasable by the program when executed and communicated with by Host Bus Adapter 12. A plurality of Disks 4 are shown (15 in the example for each DAE), but the number of disks is not a limitation of the invention, as one skilled in the art will recognize that one to several disks may be erased by the program 17. The DAE's may be in communication across paths 3, for example, which may be in a daisy-chain configuration. Regarding the disk erasure software, there are known embodiments of such software. An example of such is available from Blancco Ltd. of Joensuu, Finland. In order to certify that erasure has taken place, the Program can create a Printable File 19 that can be printed on Printer 21, or simply saved or emailed for printing later or otherwise serving as evidence of the erasure.

Figure 2:
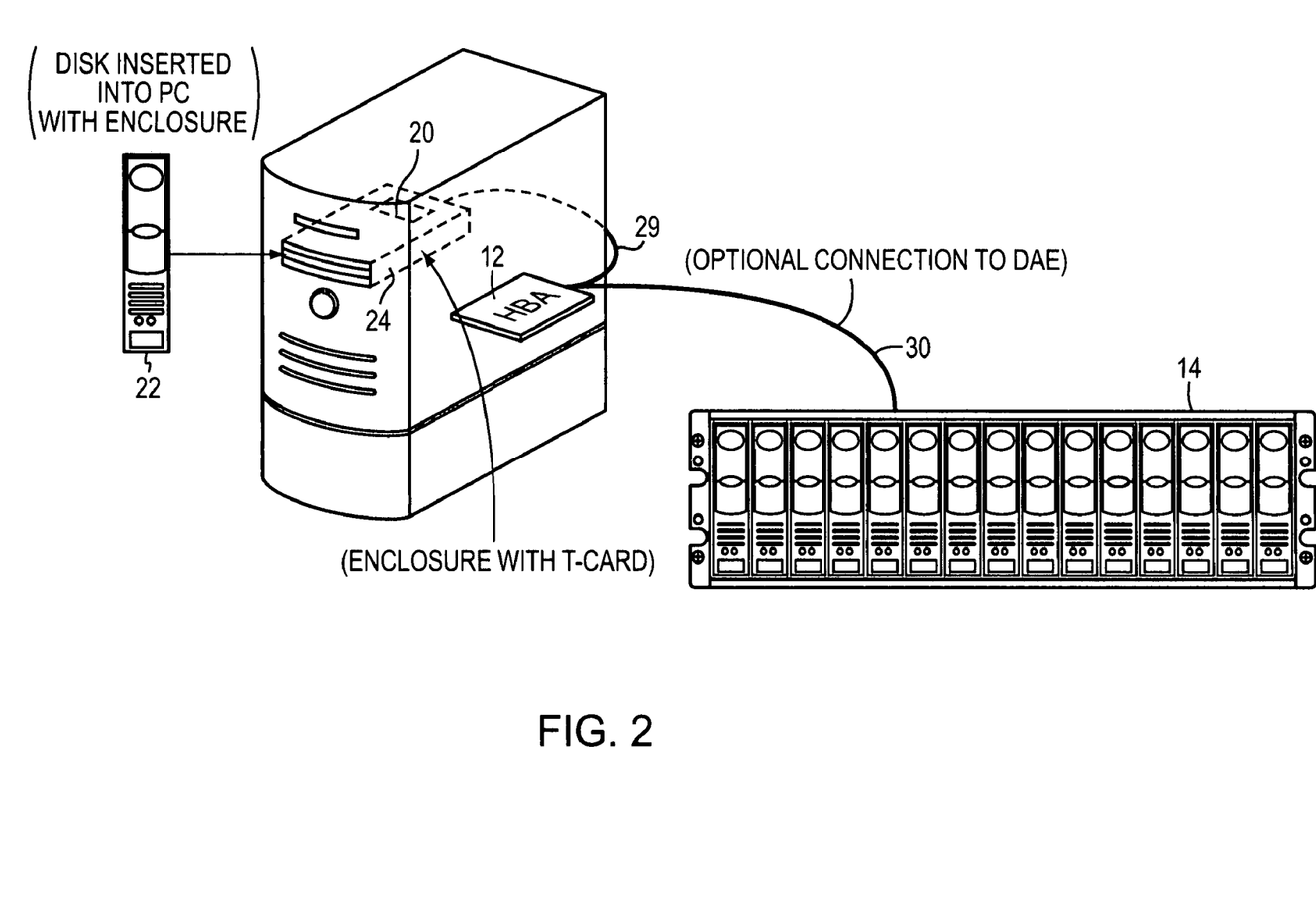
FIG. 2 is another embodiment of a non-portable disk erasure appliance including an internal enclosure for receiving a disk for erasure and an optional external disk array enclosure.

FIG. 2 is another embodiment of a non-portable disk erasure appliance including an internal enclosure 24 for receiving a disk 22 inserted into the PC server with enclosure for erasure. The PC server can communicate with the internal enclosure 24 through HBA 12, along path 29 and through communication card 20 or can communicate with an optional external disk array enclosure 14 through HBA 12 and along path 30. The communication card allows communication with Fibre Channel protocol disks. Such cards also known as T-cards, is preferably available from Sierra Technologies LLC, an example of which is the FCA-2200K 2 GB card.

Figure 3:
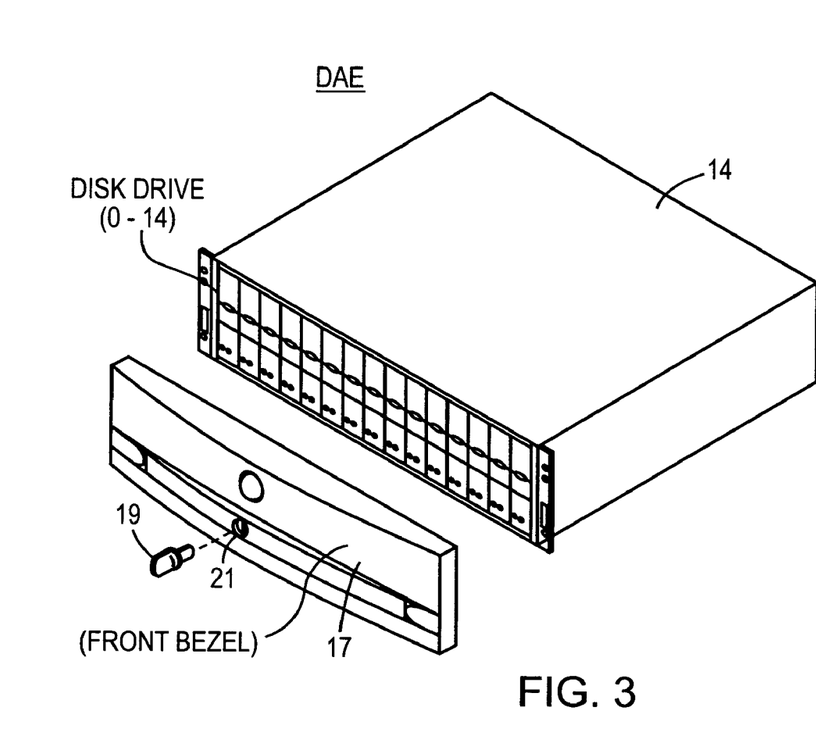
FIG. 3 shows the disk array enclosure useful to be included with the disk erasure appliance of FIG. 1 or 2.
Figure 4:
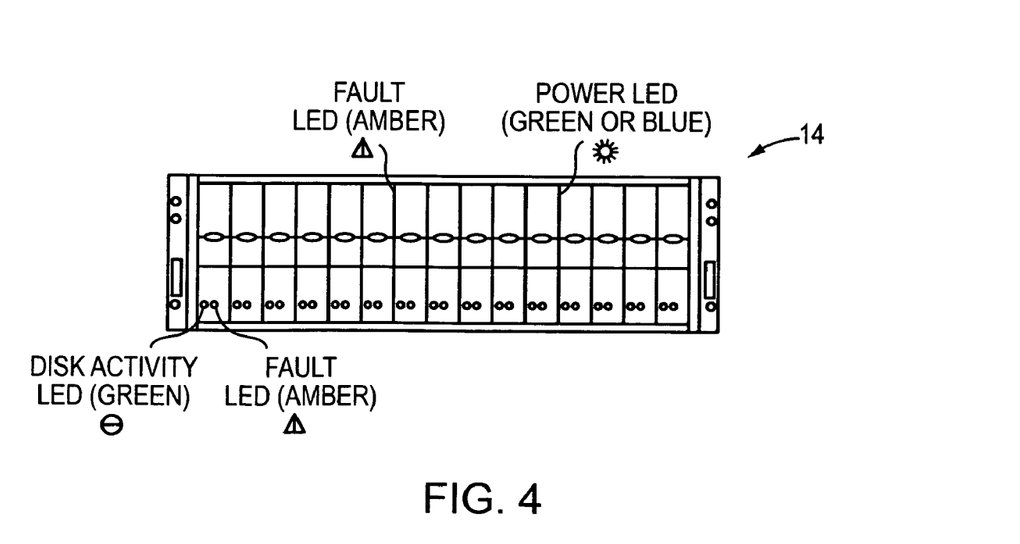
FIG. 4 is a front view of the disk array enclosure of FIG. 3 without its bezel in place.

FIGS. 3 and 4 showing the DAE 14 are discussed now. FIG. 3 shows DAE 14 including 15 drives (numbered 0-14), which may be protected by a lockable front bezel 17 including a lock 21 and key 19. FIG. 4 is a front view of the disk array enclosure of FIG. 3 without its bezel in place. Light Emitting Diodes (LED's) on each disk indicate its status, and are given, only as an example: Fault in general for the DAE may be indicated by amber color, and Power may be indicated by green or blue color, all generally accepted in the art. Disk activity may be indicated also by green, and fault at the disk level may be indicated by amber color LED.

Figure 5:
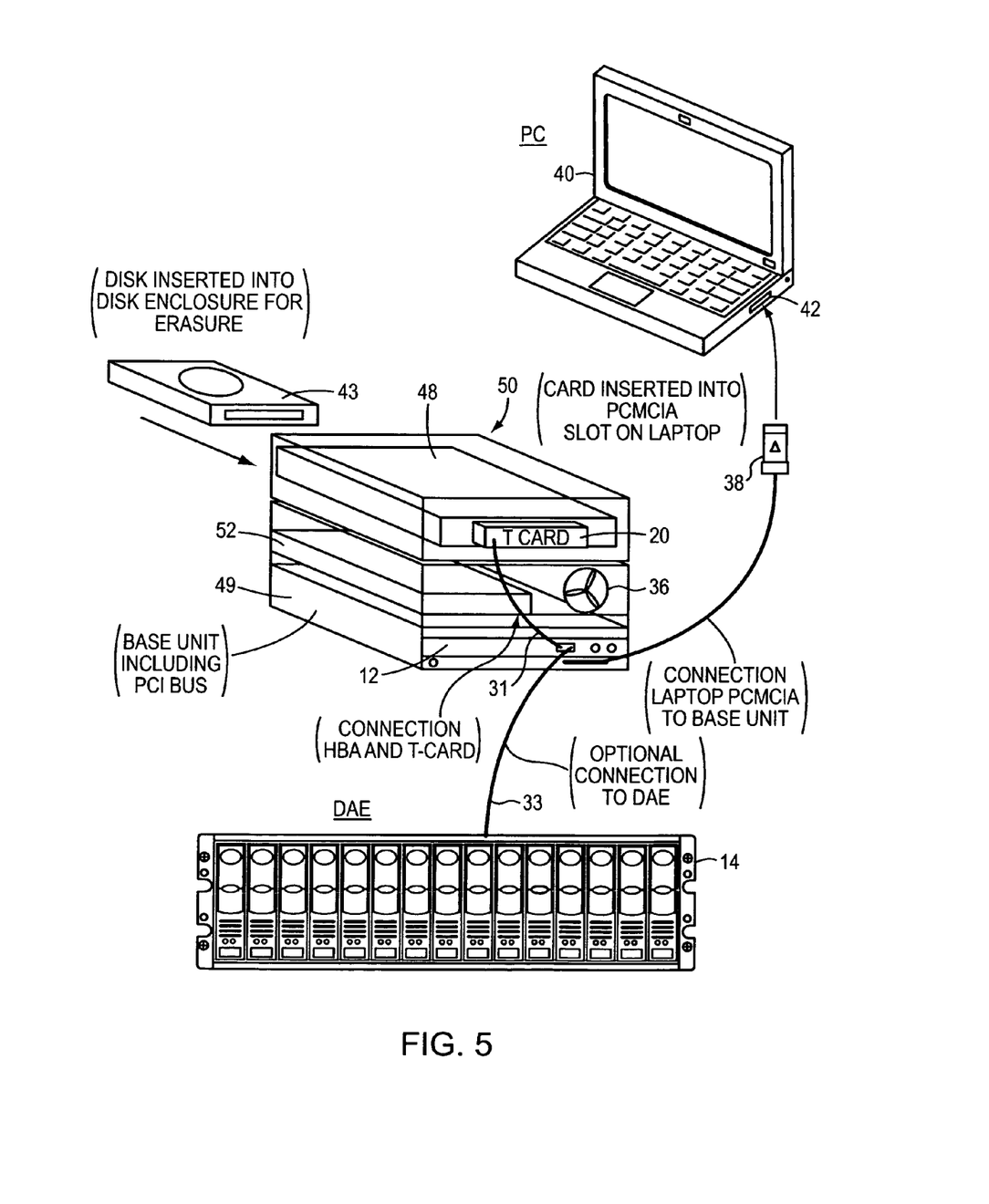
FIG. 5 is an embodiment of a portable disk erasure appliance including a portable disk unit (PDU) including a disk enclosure for accepting a disk for erasure and an optional disk array enclosure.

FIG. 5 is an embodiment of a portable disk erasure appliance including a portable disk unit (PDU) 50 including a disk enclosure for accepting a disk 43 for erasure and an optional DAE 14. The DAE communicates through path 33 with the base unit 49 of the PDU that includes a well-known PCI bus and HBA card 12. A power supply 52 powers the PDU and fan 36 cools it. Connection 31 allows the HBA card to communicate with the on-board T card 20 as described with reference to FIG. 2. A well-known PCMCIA card 38 inserted into slot 42 of Laptop PC 40 allows the PC to communicate with the PDU and Program 17 (not shown) operating on the PC erases disk 43 in disk enclosure 48. The disks on DAE 14 can also be erased by the Program for erasure loaded on PC 40.

Figure 6:
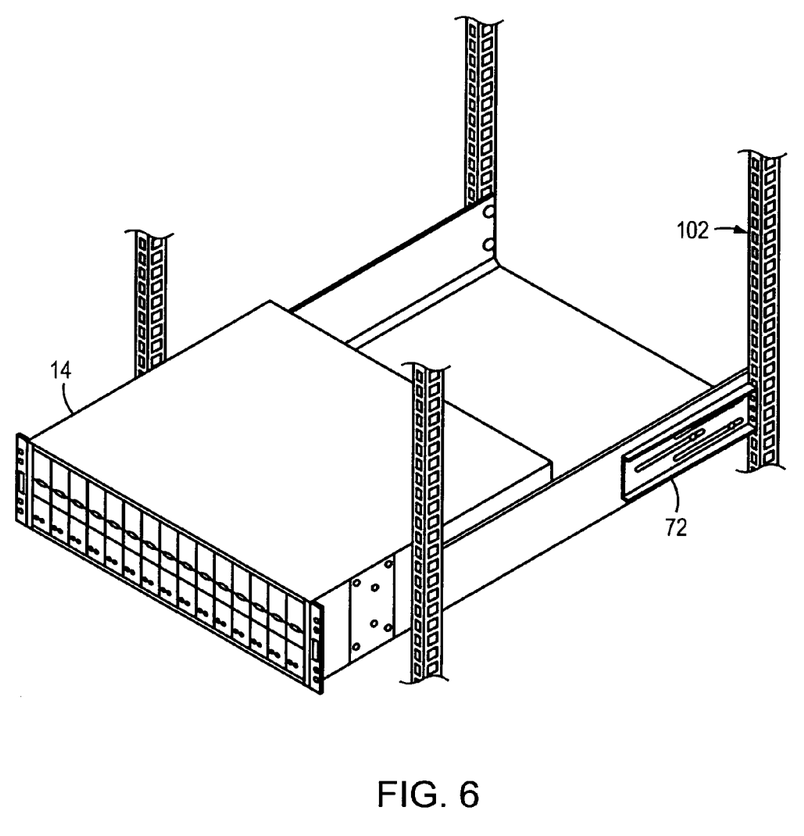
FIG. 6 is a rack-mounted embodiment of a disk array enclosure.
Figure 7:
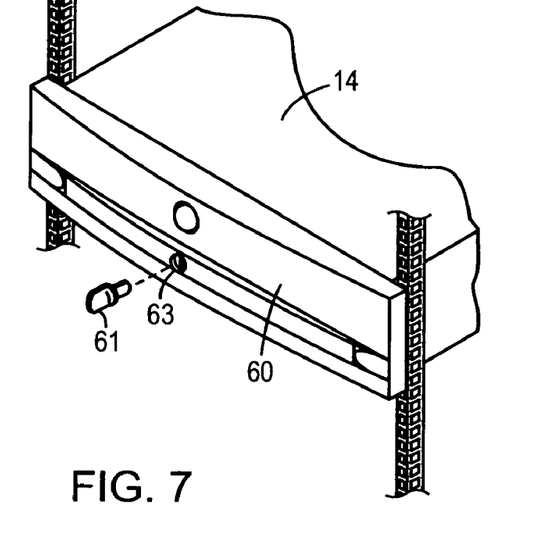
FIG. 7 is a rack-mounted bezel with lock for the rack-mounted disk erasure enclosure of FIG. 6.
Figure 8:
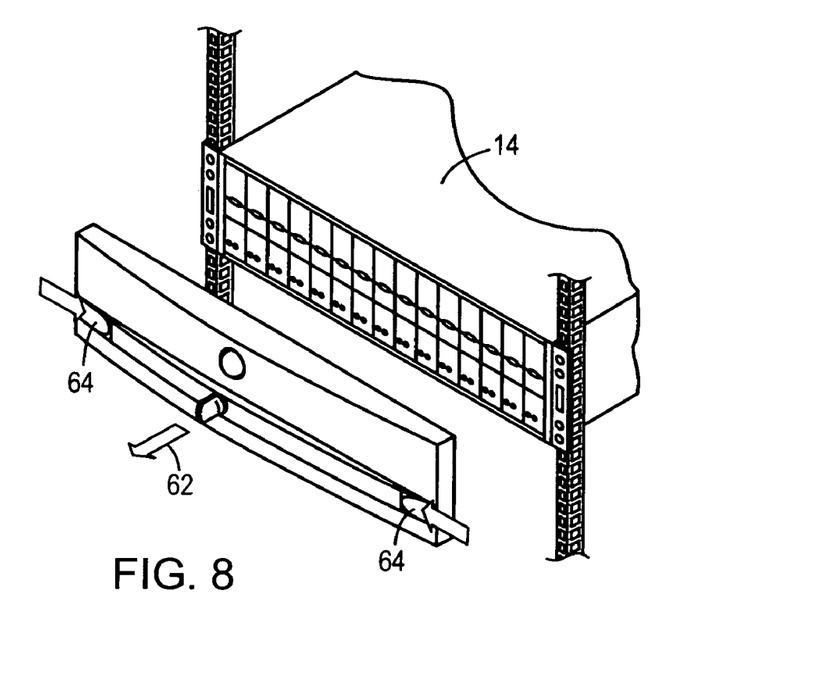
FIG. 8 is a view showing that the bezel of FIG. 7 may be removed to expose the rack-mountable disk array enclosure of FIG. 6.

FIGS. 6-8 are now discussed. FIG. 6 is a rack-mounted embodiment of DAE 14 on rails 72 attached to rack 102 (shown in partial view, for the sake of simplicity. FIG. 7 is a rack-mounted bezel with lock for the rack-mounted disk erasure enclosure of FIG. 6. The optional front bezel 60 with lock 63 is lockable or un-lockable by key 61. FIG. 8 is a view showing that the bezel of FIG. 7 may be removed to expose the rack-mountable disk array enclosure of FIG. 6. The bezel may be removed in direction 62 by application of pressure at points 64.

Figure 9:
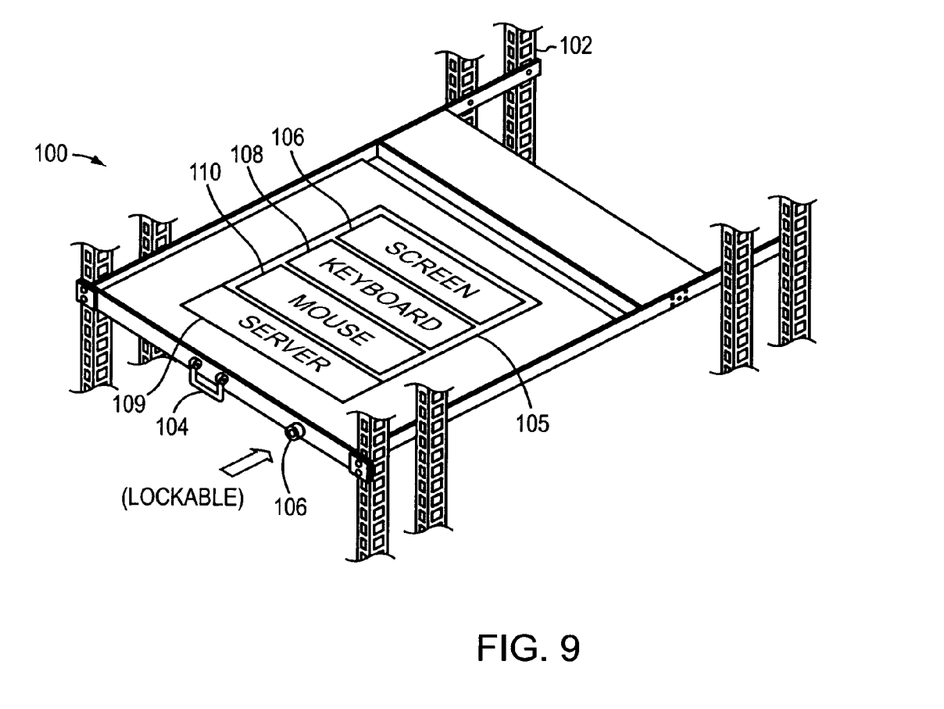
FIG. 9 is a schematic including a functional block diagram of a rack mounted keyboard, video screen, and mouse (KVM) module combined with a server that may be used to run disk erasure software for erasing one or more disks of the rack-mountable disk array enclosure of FIG. 6.

FIG. 9 is a schematic including a functional block diagram of a rack mounted keyboard (K) 108, video screen (V) 106, and mouse (M) 110 comprising Keyboard-Video-Mouse of KVM module 105. The KVM module 105 is operationally combined with a Server 109 that may be used to run Program 17 that includes disk erasure software for erasing one or more disks of the rack-mountable disk array enclosure of FIG. 6. The KVM is mounted in Housing 100 that includes a handle 104 that is lockable with lock 106 (key not shown for simplicity) and which Housing is mounted on rack 102. Preferably, KVM 105 and Server 109 are not combined, but one skilled in the art will recognize that one may configure them separately or combined in view of the teachings herein.

Figure 10:
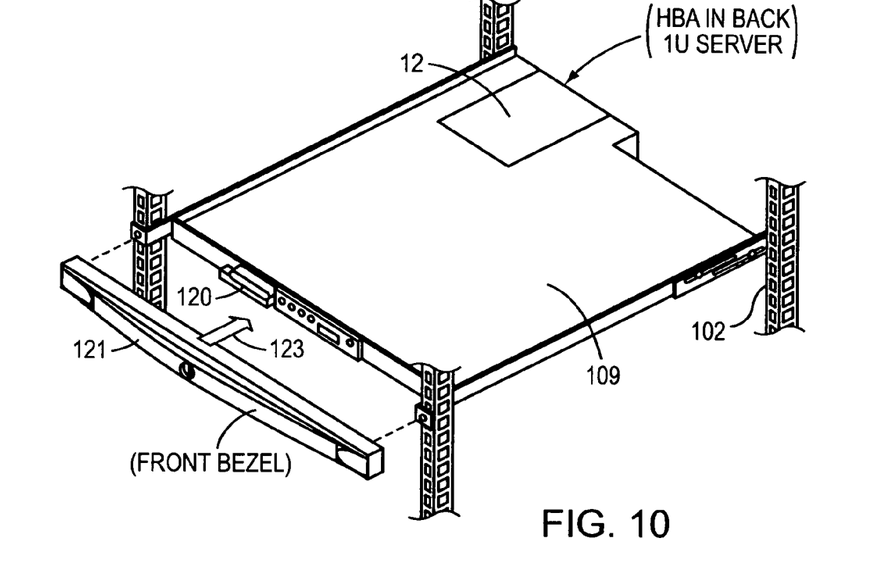
FIG. 10 is a view of the server of FIG. 9 with an attachable front bezel and a port for receiving disk erasure software.
Figure 11:
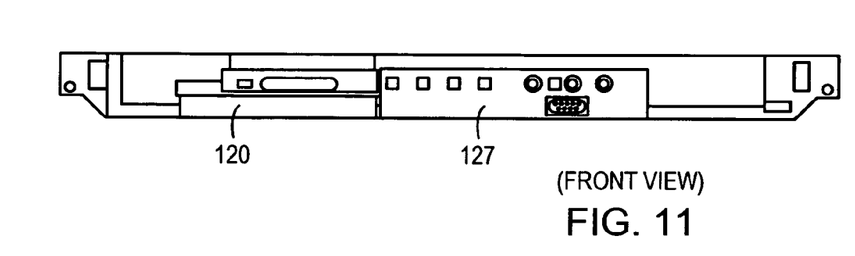
FIG. 11 is a front view of the server of FIGS. 9 and 10 and including the port for receiving disk erasure software.
Figure 12:
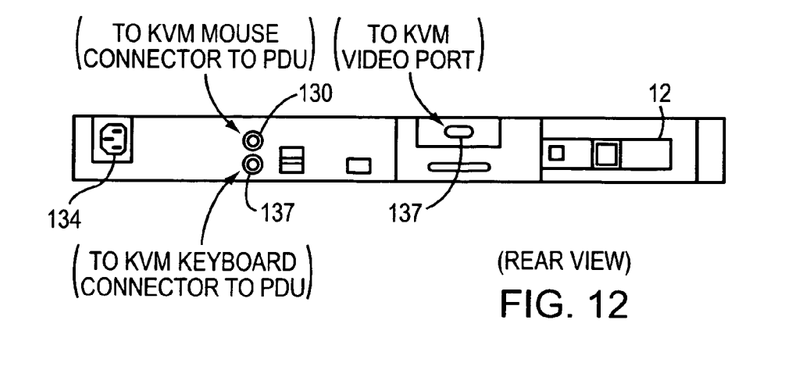
FIG. 12 is a rear view of the server of FIGS. 9 and 10 and connectors and communication ports for the KVM module.

FIGS. 10-12 are now discussed. FIG. 10 is a view of the server of FIG. 9 with an attachable front bezel 121 and a port 120 (e.g. a CD-ROM drive) for receiving disk erasure software, such as Program 17 on a CD-ROM. The bezel 121 is mounted on rack 102 in direction 123 for attaching to Server 109 that includes HBA 12. The Server is preferably of 1 U height. FIG. 11 is a front view of the server of FIGS. 9 and 10 and including the port 120 for receiving disk erasure software, and front electronics connections/communications area 127. FIG. 12 is a rear view of the server of FIGS. 9 and 10 and connectors and communication ports for the KVM module. The mouse connection 130 receives a mouse connector to the KVM module. Likewise, and connection 137 receives a keyboard connector to the KVM module. Similarly, a KVM video port 139 receives a video input from the screen on the KVM module. HBA card 12 communicates as described with the other embodiments described above.

Figure 13:
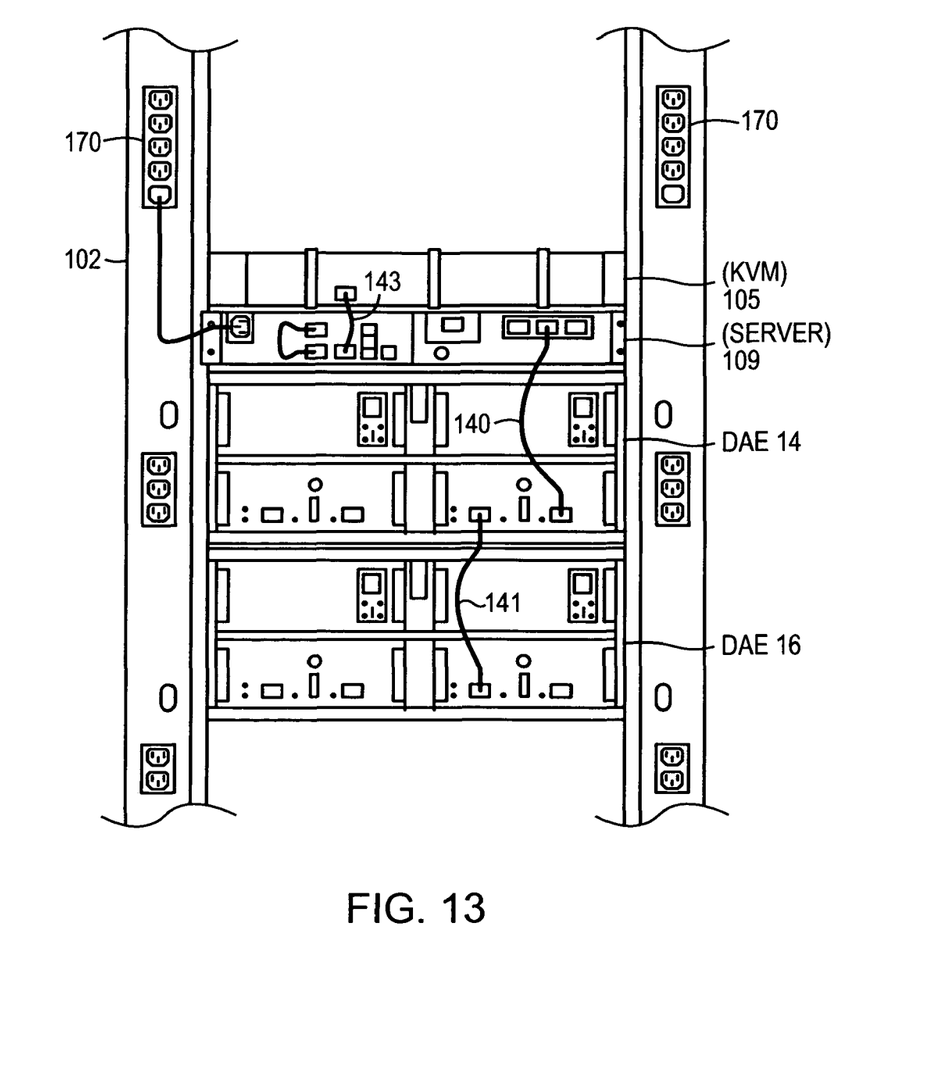
FIG. 13 is a rear view of the KVM module, server, and disk array enclosures (DAE) rack-mounted.

FIG. 13 is a rear view of the rack 102 housing the KVM module 105, server 109, and disk array enclosures (DAE) rack-mounted with AC-power outlets 170. For simplicity not all power connections are shown, nor are all communications path shown, but communication paths between the Server and KVM have been described with reference to FIGS. 11 and 12, and path 143 is shown to represent that generally the Server and KVM communicate. Communication Path 140 connects the Server to DAE 14, which is daisy-chained along Path 141 to DAE 16. Server 109 is also connected to KVM 105 along path 143.

Figure 14:
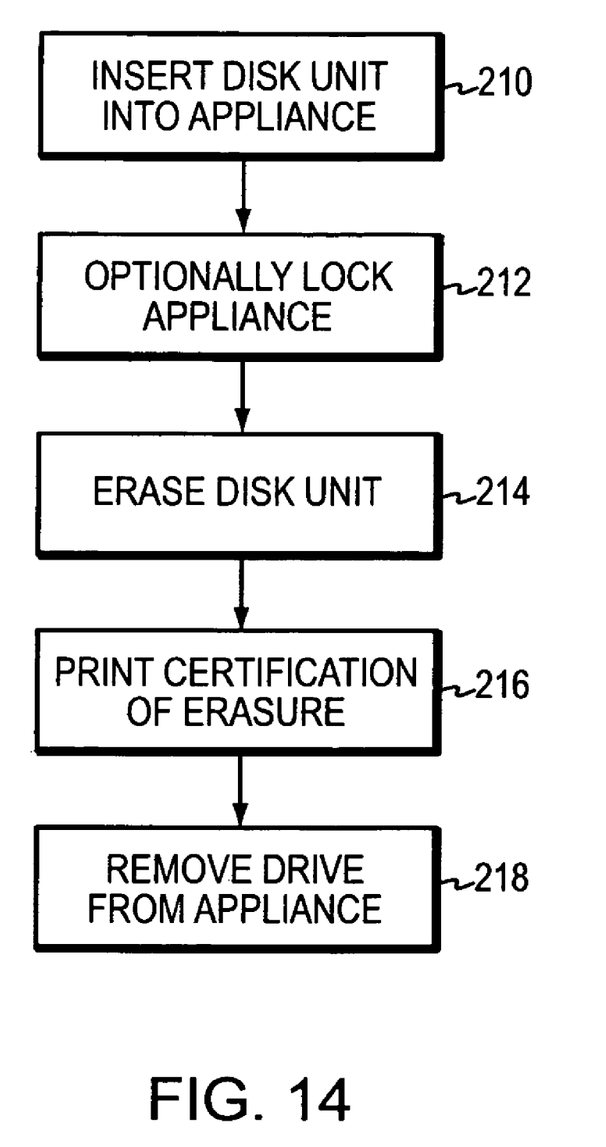
FIG. 14 is a an overview of a method embodiment of certifying disk erasure useful with the appliance depicted in the embodiments of FIGS. 1-3, 5, and 9.

FIG. 14 is an overview of a method embodiment of certifying disk erasure useful with the Appliance depicted in the embodiments of FIGS. 1-3, 5, and 9. In step 210, a user inserts disk unit 210 into the Appliance. The Appliance is optionally locked in step 210. The Program erases the inserted disk in step 214. A certification certificated is printed (preferably to a file, e.g. a well-known PDF format file) in step 216. The Drive is removed from Appliance in step 218. One skilled in the art will recognize that the steps are useful for the DAE configuration as well, wherein the drives are inserted into the DAE, instead of or in addition to a Drive inserted into an enclosure in the Server on a PDU, each discussed above.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for certifying erasure of data from a data storage disk drive unit comprising the steps of:

identifying that one or more data storage disk drive are failing; wherein each of the one or more data storage disk drive are located in one or more machines;

providing a server having a host bus adapter with a software program capable of enabling the host bus adapter to selectively erase one or more of the failing disk drive units in the disk drive enclosure by communication of the server's software program capable of selectively erasing to the disk array enclosure by the host bus adapter of the server; wherein the server has an enclosure and wherein the host bus adapter is accessible via an externally accessible disk enclosure, wherein the externally accessible disk enclosure is external from the server enclosure and wherein the externally accessible disk enclosure facilitates disk drives to be inserted and removed from the disk enclosure;

removing the one or more failing data storage disk drives that are failing from the one or more machines;

inserting the one or more failing data storage disk drives to be erased into the disk enclosure external to the server; wherein the failing data storage disk is capable of communication with the host bus adapter;

erasing the inserted one or more failing data storage disk drives, wherein the erasure of the one or more failing data storage disk drives may be cotemporaneous; wherein the software program communicates with the host bus adapter causing the host bus adapter to erase the failing data storage disk drive; wherein the server is enabled to have disks inserted while the server is on and erase the disks without rebooting the server;

and creating, with the software program, a printable file indicating that the failing data storage disk drive unit has been erased, wherein the printable file is usable to show that the data storage disk drive unit has been erased.

2. The method of claim 1, wherein the printable file is printed on a printer.

3. The method of claim 1, wherein the printable file is stored on the server.

4. The method of claim 1, wherein the printable file or a copy of the printable file is electronically sent from the server.

5. The method of claim 1 wherein the external enclosure is enabled to read Fiber Channel Disks.

6. A system comprising:

a server comprising an enclosure, a host bus adapter, and a software program; wherein the server has an enclosure and wherein the host bus adapter is accessible via an externally accessible disk enclosure;

an external data storage disk drive enclosure communicatively coupled to the host bus adapter and the software program; wherein the externally accessible disk enclosure is external from the server enclosure and wherein the externally accessible disk enclosure facilitates disk drives to be inserted and removed from the disk enclosure; wherein the software program is capable of enabling the host bus adapter to selectively erase one or more of the failing disk drive units, wherein the one or more failing data storage disk drive units where located in, identified as, and removed from one or more machines, in the external disk drive enclosure by communication of the server's software program capable of selectively erasing to the disk array enclosure by the host bus adapter of the server; wherein the failing data storage disk is capable of communication with the host bus adapter; wherein the server is enabled have disks inserted while the server is on and erase the disks without rebooting the server; and wherein upon erasing a failing disk the software program, creates a printable file indicating that the failing data storage disk drive unit has been erased, wherein the printable file is usable to show that the data storage disk drive unit has been erased.

7. An apparatus comprising:

a server comprising an enclosure, a host bus adapter, and a software program; wherein the server has an enclosure and wherein the host bus adapter is accessible via an externally accessible disk enclosure;

an external data storage disk drive enclosure communicatively coupled to the host bus adapter and the software program; wherein the externally accessible disk enclosure is external from the server enclosure and wherein the externally accessible disk enclosure facilitates disk drives to be inserted and removed from the disk enclosure; wherein the software program is capable of enabling the host bus adapter to selectively erase one or more of failing disk drive units, wherein the one or more failing data storage disk drive where located in, identified as, and removed from one or more machines, in the external disk drive enclosure by communication of the server's software program capable of selectively erasing to the disk array enclosure by the host bus adapter of the server; wherein the failing data storage disk is capable of communication with the host bus adapter; wherein the server is enabled have disks inserted while the server is on and erase the disks without rebooting the server; and wherein upon erasing a failing disk the software program, creates a printable file indicating that the failing data storage disk drive unit has been erased, wherein the printable file is usable to show that the data storage disk drive unit has been erased.

8. The method of claim 1 wherein the inserted one or more failing data storage disk drives to be erased into the disk enclosure are enabled to be selectively locked in the enclosure.

9. The apparatus of claim 6 wherein the inserting the one or more failing data storage disk drives to be erased into the disk enclosure are enabled to be selectively locked in the enclosure.

10. The system of claim 7 wherein the inserted one or more failing data storage disk drives to be erased into the disk enclosure are enabled to be selectively locked in the enclosure.

11. The method of claim 1 wherein the inserted the one or more failing data storage disk drives to be erased into the disk enclosure are associated with a status indicator.

12. The apparatus of claim 6 wherein the inserted the one or more failing data storage disk drives to be erased into the disk enclosure are associated with a status indicator.

13. The system of claim 7 wherein the inserted the one or more failing data storage disk drives to be erased into the disk enclosure are associated with a status indicator.

* * * * *